(12) United States Patent
Lu

(10) Patent No.: US 8,944,842 B2
(45) Date of Patent: Feb. 3, 2015

(54) INSULATION DISPLACEMENT TERMINAL BLOCK, ELECTRICAL JACK, JACK MODULE AND MODULAR PATCH PANEL

(71) Applicant: Lantek Electronics Inc., New Taipei (TW)

(72) Inventor: Shan-Jui Lu, New Taipei (TW)

(73) Assignee: Lantek Electronics Inc., New Taipei (TW)

( * ) Notice: Subject to any disclaimer, the term of this patent is extended or adjusted under 35 U.S.C. 154(b) by 59 days.

(21) Appl. No.: 13/722,907

(22) Filed: Dec. 20, 2012

(65) Prior Publication Data
US 2013/0164967 A1    Jun. 27, 2013

(30) Foreign Application Priority Data
Dec. 23, 2011   (AU) ................................. 2011905432

(51) Int. Cl.
*H01R 4/24*     (2006.01)
*H01R 13/6463*  (2011.01)
*H04Q 1/02*     (2006.01)
*H01R 24/64*    (2011.01)

(52) U.S. Cl.
CPC .......... *H01R 4/2404* (2013.01); *H01R 13/6463* (2013.01); *H04Q 1/13* (2013.01); *H01R 24/64* (2013.01)
USPC ....................................................... 439/404

(58) Field of Classification Search
USPC ................................................ 439/404, 405
See application file for complete search history.

(56) References Cited

U.S. PATENT DOCUMENTS

| | | | | |
|---|---|---|---|---|
| 5,601,447 A * | 2/1997 | Reed et al. | .................... | 439/404 |
| 6,854,998 B2 * | 2/2005 | Yuan | ............................. | 439/404 |
| 7,422,467 B2 * | 9/2008 | Siev et al. | .................... | 439/404 |
| 7,568,938 B2 * | 8/2009 | Siev et al. | .................... | 439/404 |
| 7,811,118 B2 * | 10/2010 | Caveney et al. | ............. | 439/404 |
| 7,922,515 B2 * | 4/2011 | Fitzpatrick et al. | .......... | 439/404 |
| 8,157,582 B2 * | 4/2012 | Frey et al. | ................. | 439/540.1 |
| 8,182,281 B2 * | 5/2012 | Miller et al. | .................. | 439/404 |
| 2009/0111317 A1 * | 4/2009 | Fitzpatrick et al. | .......... | 439/404 |
| 2010/0159736 A1 * | 6/2010 | Brear | ............................ | 439/404 |

* cited by examiner

Primary Examiner — Gary Paumen
(74) Attorney, Agent, or Firm — Maschoff Brennan

(57) ABSTRACT

An insulation displacement contact terminal block for providing electrical contact with a bundle of twisted pair wires having at least two differentially driven wire-pairs, a first wire-pair diverging from a second wire-pair at a diverging point of the bundle, and a first wire of each wire-pair untwisting from a second wire of that wire-pair at an untwisting point, the terminal block comprising a first contact-pair and a second contact-pair. The first contact-pair comprising first and second insulation displacement contacts for electrical connection with respective first and second wires of the first wire-pair. The second contact-pair comprising first and second insulation displacement contacts for electrical connection with respective first and second wires of the second wire-pair. The first and second insulation displacement contacts of each contact-pair are substantially equidistant from the untwisting point and are proximate to the untwisting point.

5 Claims, 13 Drawing Sheets

INSULATION DISPLACEMENT TERMINAL BLOCK, ELECTRICAL JACK, JACK MODULE AND MODULAR PATCH PANEL

CROSS-REFERENCE TO RELATED APPLICATIONS

This non-provisional application claims priority under 35 U.S.C. §119(a) on Provisional Patent Application No(s). 2011905432 filed in Australia on Dec. 23, 2011, the entire contents of which are hereby incorporated by reference.

TECHNICAL FIELD

The present disclosure relates to electrical connectors. In particular, the present disclosure relates to electrical connectors used for balanced pair communications.

BACKGROUND

Electrical connectors such as modular plugs and jacks are commonly used as components in balanced twisted pair communications cabling reticulation networks. Applications include computer local area networks (LAN's) and telecommunications networks, where such connectors are typically used to connect terminal devices such as computers and telephone equipment to the building structured cabling system horizontal cabling.

One common type of modular connector used for such applications is the RJ45. International standards such as EIA-568-C.2 and ISO 11801 define the performance requirements for connectors used for balanced pair applications, and in particular for RJ45 connectors. The standards specify various levels of performance by category (e.g. Category 5e, 6 and 6A in particular). These requirements include high frequency transmission performance benchmarks, defined in terms of parameters such as near-end crosstalk (NEXT) and return loss (RL).

Crosstalk may be defined as unwanted signal coupling between one communications circuit and another adjacent circuit. It represents a form of interference between adjacent circuits and hence has a deleterious effect on circuit operation. The close physical spacing and layout of the conductors inside a balanced pair connector such as the RJ45 and the standardized requirements for cable pair leg assignments imply that undesirably high levels of crosstalk will be induced onto the circuits passing through the connector unless special measures are taken in the design of the connector to counteract it. When designing balanced pair connectors, a great deal of design effort is required to reduce the amount of crosstalk arising within the mated connector to a level which complies with the relevant standards requirements.

In order for an RJ45 connector to comply with the performance requirements of the international standards, the connector design must incorporate crosstalk compensation techniques. This is because an uncompensated jack, when mated with a plug, exhibits crosstalk characteristics which far exceed the limits imposed by the standards. In order to achieve standards compliance, a connector must not only compensate for crosstalk which arises within the jack, but also the very significant amount of crosstalk which arises in the plug. Since crosstalk increases with frequency, this becomes more important at the higher performance categories (e.g. Cat 6 and Cat 6A) because of the progressively higher frequencies involved and the more stringent standards requirements. Performance requirements are specified to 100 MHz for Cat 5e, to 250 MHz for Cat 6 and to 500 MHz for Cat 6A connectors. Thus any technique which reduces the amount of crosstalk which arises in the jack is considered very worthwhile, because it reduces the amount of crosstalk compensation required.

With early design connectors relatively simple capacitive crosstalk compensation measures were employed, and these were sufficient to achieve compliance with the performance requirements of the relevant standards at that time. As technology has advanced, however, computer network speeds have increased exponentially and the connector performance requirements have been commensurately tightened in the standards so as to reflect the more onerous network speed requirements. This has made it progressively more and more difficult to design a standards-compliant connector. Thus any aspect of connector design which improves a connector's transmission performance, or makes it easier for the installer to terminate or install is very worthwhile.

The purpose of an electric circuit is to contain a signal and guide it from the source to the receiver. At high frequencies, circuits act like transmission lines. All transmission lines have a property known as characteristic impedance. When signals travel along the transmission line, reflections are generated at points along the circuit where the circuit impedance differs from the line characteristic impedance. Reflections are undesirable on communications circuits because they represent a source of signal loss. On some types of circuits they can also cause interference back at the signal source. The return loss of a circuit provides a measure of the degree of impedance mismatch caused by such circuit impedance deviations or discontinuities. Due to its inherently unsymmetrical physical construction, a mated RJ45 connector represents a significant impedance mismatch when used at high frequencies in balanced pair circuits.

It is an object of the present disclosure to at least overcome some of the crosstalk and return loss problems associated with prior art electrical connectors.

SUMMARY

In a first aspect of the disclosure there is provided an insulation displacement contact terminal block for providing electrical contact with a bundle of twisted pair wires having at least two differentially driven wire-pairs, a first wire-pair diverging from a second wire-pair at a diverging point of the bundle, and a first wire of each wire-pair untwisting from a second wire of that wire-pair at an untwisting point, the terminal block comprising:

a) a first contact-pair comprising first and second insulation displacement contacts for electrical connection with respective first and second wires of the first wire-pair, b) a second contact-pair comprising first and second insulation displacement contacts for electrical connection with respective first and second wires of the second wire-pair, wherein the first and second insulation displacement contacts of each contact-pair are substantially equidistant from the untwisting point and are proximate to the untwisting point so as to minimise crosstalk between the wire pairs, and wherein the first and second insulation displacement contacts of each contact-pair are substantially adjacent to each other and the first and second contact pairs are sufficiently remote from each other so as to minimise cross-talk between the wire-pairs and provide minimum degradation of return loss of the circuit defined by each wire-pair.

According to a second aspect of the disclosure there is provided an electrical jack comprising at least one insulation displacement contact terminal block according to the first aspect of the disclosure.

According to a third aspect of the disclosure there is provided a jack module comprising at least two electrical jacks according to the second aspect of the disclosure.

According to a fourth aspect of the disclosure which comprises at least one jack module which is adapted to be received and retained within a jack module housing adapted to be rack mounted.

BRIEF DESCRIPTION OF THE DRAWINGS

The present disclosure will become more fully understood from the detailed description given herein below for illustration only, and thus does not limit the present disclosure, wherein.

DETAILED DESCRIPTION

Figure 1:
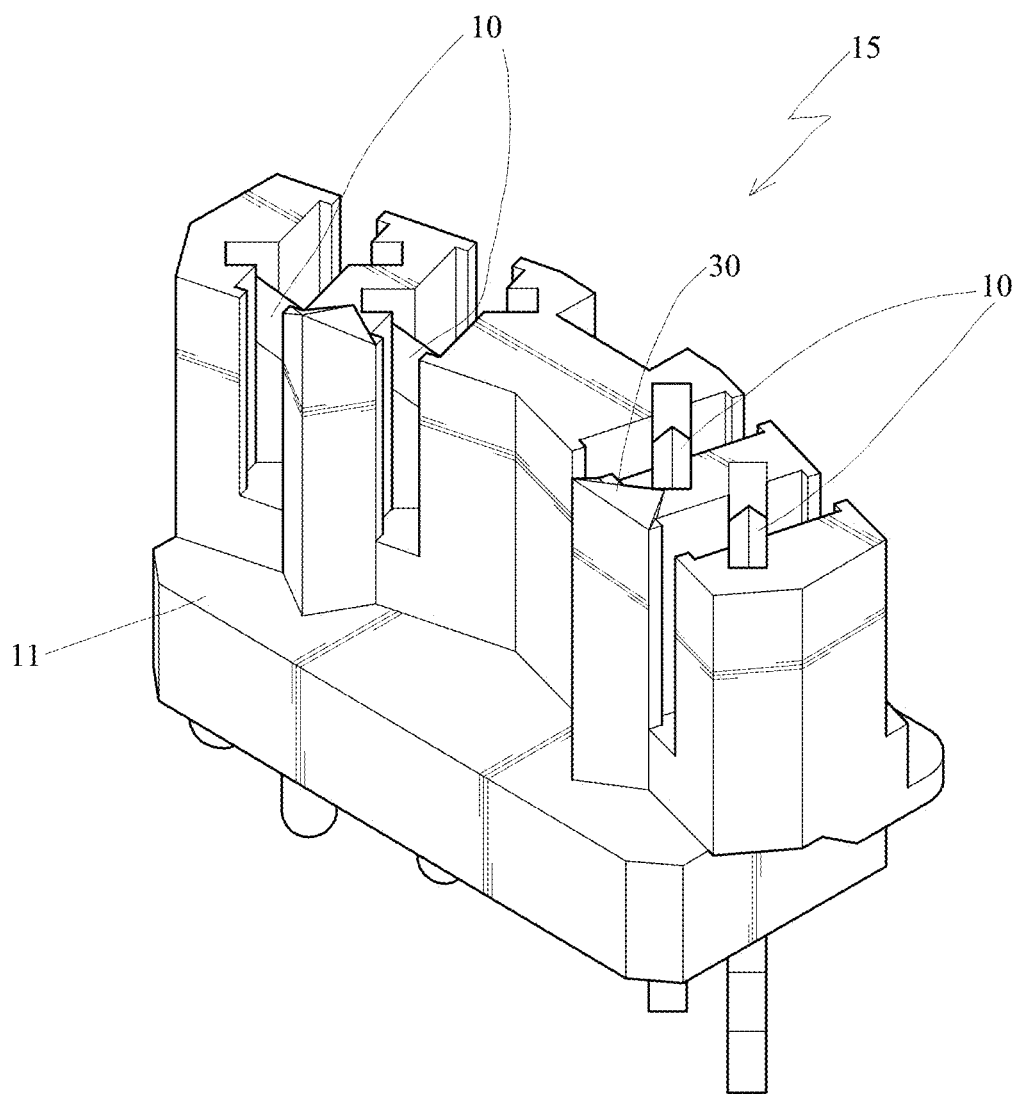
FIG. 1 is a perspective view of a single insulation displacement contact terminal block according to a first embodiment of the first aspect of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

FIG. 1 shows a single IDC terminal block 15. The IDC terminal block 15 is not connected to a jack housing in this drawing and it features a mount 11 upon which are mounted two pairs of Insulation Displacement Connectors (IDC's) 10, each for connecting a single wire from a twisted wire pair. There is also a protruding portion 30 of the IDC terminal block 15 which is located centrally between contacts 10 and is shaped so as to facilitate splitting apart the twisted wire pair as the wire pair is inserted into the IDC terminal block 15.

Figure 2:
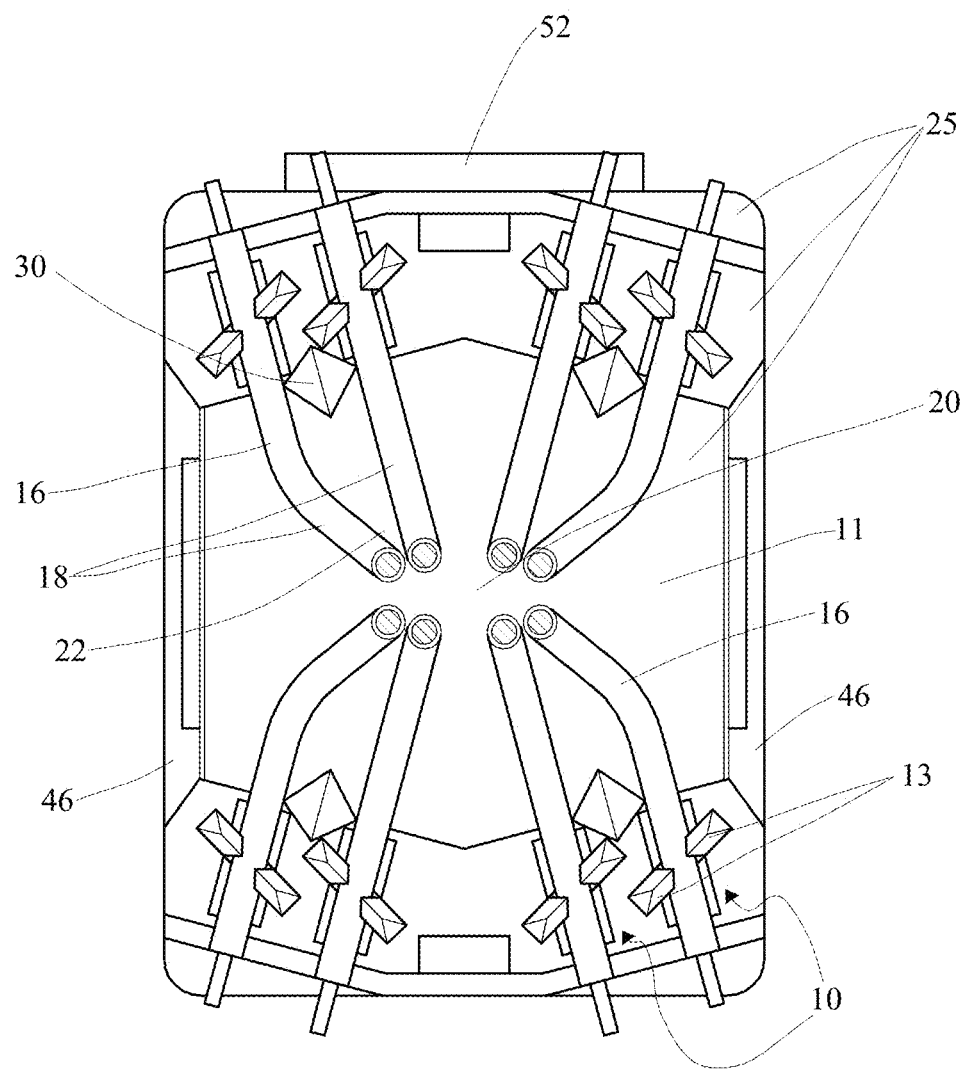
FIG. 2 is a rear view of an RJ45 jack assembly according to a second aspect of the disclosure which incorporates an insulation displacement contact terminal block (hereafter "IDC terminal block") according to a second embodiment of the first aspect of the disclosure, where the RJ45 jack assembly is depicted engaging four wire pairs of a four pair cable.

FIG. 2 depicts the rear of a RJ45 jack that is comprised of a IDC terminal block 25 contained within a first jack housing 46. In this diagram the IDC terminal block 25 is integrally formed and features 4 pairs of IDC's 10 mounted on a mount 11. In alternate embodiments (not shown), two IDC terminal blocks 15 could be utilised in place of a single IDC terminal block 25. What is important is the configuration and location of each IDC pair that is located in an IDC terminal block and not how many are present on any one mount 11. Each IDC 10 has an electrically conductive part which comprises two mutually opposed cutters 13 which the wire 16 is forced between to cut through the wire insulation and form an electrical connection between the wire 16 and the IDC 10. Mount 11 provides the means to support the IDC's 10 in the locations described below. According to the disclosure, IDC's 10 within a pair of IDC's are placed as close together as possible and where pairs of IDCs 10 are placed as far apart as possible on the mount 11.

Continuing to refer to FIG. 2, wires 16 are derived from bundles of twisted pair wires 18 which are enclosed in an insulated jacket forming a cable (not shown). Each pair of wires 16 that forms a twisted wire pair 18 is matched with a pair of IDC's 10. Twisted wire pairs diverge from each other at a point of divergence 20 of the bundle. Each wire 16 of a twisted wire pair 18 diverges from its mate at an untwisting point 22. Each of the wires 16 is received into its respective receiving part of the IDC 10 where its insulation is cut and electrical contact is made. The lengths of wire 16 comprising a pair are essentially the same from the point of untwisting 22 to the point of contact with its respective electrically contacted IDC 10. Keeping the pairs of wires the same length assists with minimising return loss degradation.

Figure 3:
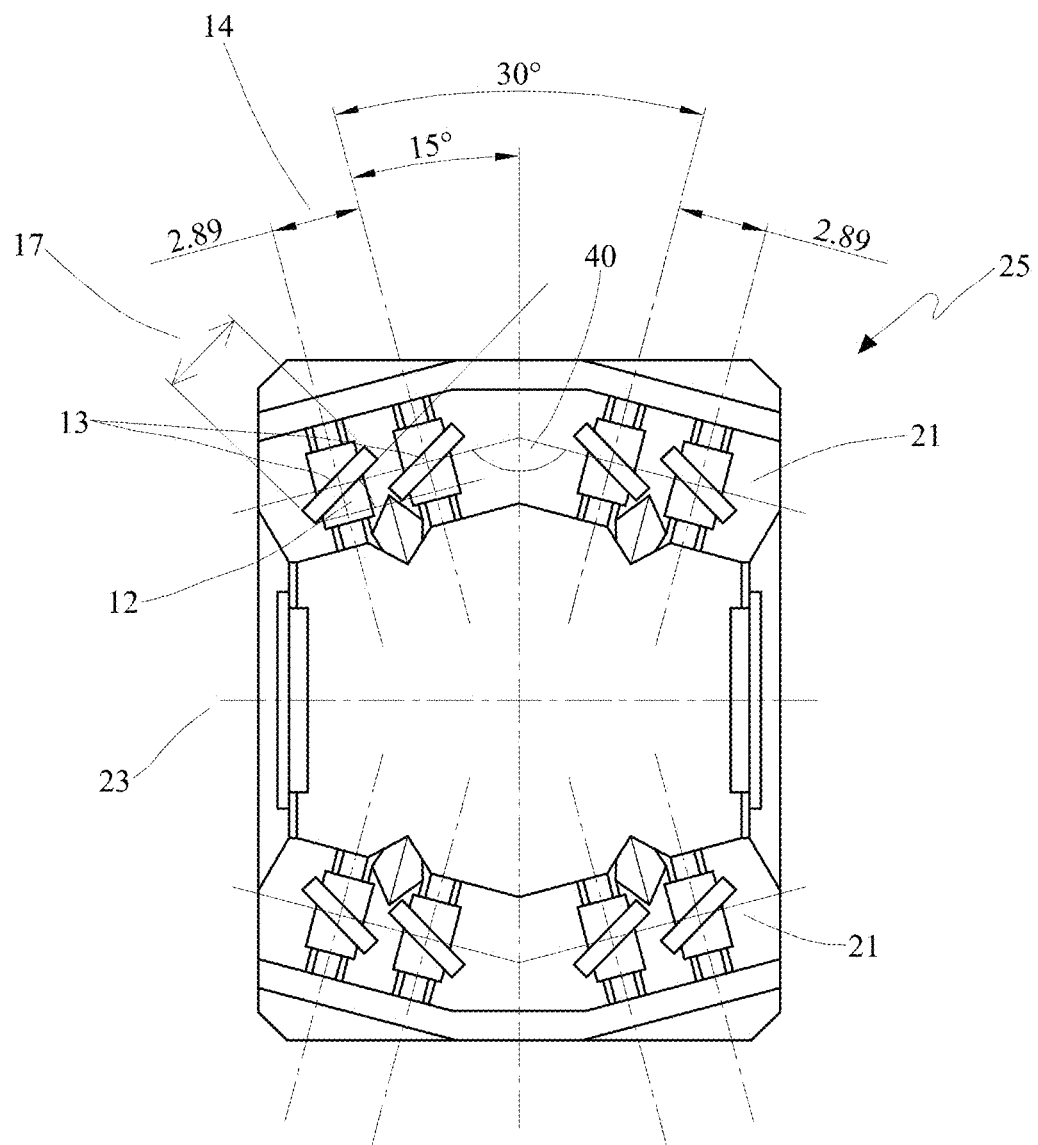
FIG. 3 is a rear view of an IDC terminal block according to the second embodiment of the first aspect of the disclosure depicted in FIG. 2, in which the angles of certain structural elements have been selected to provide the geometrical features which allow for the implementation of crosstalk reduction and optimisation of return loss.

In order to keep the wire pair lengths from the point of untwisting 22 to the point of contact 10 essentially the same, each IDC 10 of an IDC pair is to be positioned as close to the other as possible. This further contributes to the reduction of crosstalk. This is achieved by having the cutters 13 of the IDC's 10 arranged such that they are parallel and the planes of the cutters 13 in a pair of IDCs 10, subtend an angle of substantially greater than 0 degrees to the centre line. This allows for the cutters 13 and hence the IDCs 10 to be mounted in close proximity to each other, such that the perpendicular distance between them is less than the width of the flat side of the IDC. This is best shown in FIG. 3 which is a rear view of IDC terminal block 25. Angle 12 is approximately 35 degrees and is the angle that the cutters 13 are subtended so that the distance between them 14 is shorter than 17.

Further, each pair of IDCs 10 are mounted such that the planes containing the faces of a first pair and second pair of IDCs 10 are substantially orthogonal and spaced far apart, such that the spacing between any of the pairs of IDCs 10 exceeds the spacing between any two IDCs 10 forming a pair of IDCs 10. FIG. 3. depicts this arrangement and further, indicated that the pairs of IDCs 10 on each side of the axis of symmetry 23 are closer to each other than they are to the IDC's 10 on the opposite side of the axis of symmetry 23.

FIG. 3 also demonstrates also shows the mirrored V shaped arrangement of IDCs 10 on the mount 11. Firstly the IDC pairs are arranged in a mirror image such that straight lines, drawn through the centres of each pair of adjacent IDCs cutters 13, intersect to form a V shape 21 which is mirrored on the other side of the IDC terminal block 25, across the axis of symmetry 23. Angle 40 is approximately 150 degrees.

The arrangements described above minimise the amount of sheath which needs to be removed from the cable in order for it to be terminated.

The outer dimensions of IDC terminal blocks 15 and 25 are of standard shapes and sizes so they can be installed in standard jacks already available in the market place. Each pair of IDCs 10 (for each pair of wires 16 of a twisted wire pair 18) is positioned so as to maximise the distance between them within the confines of the standard outer dimension of the jack.

Figure 4:
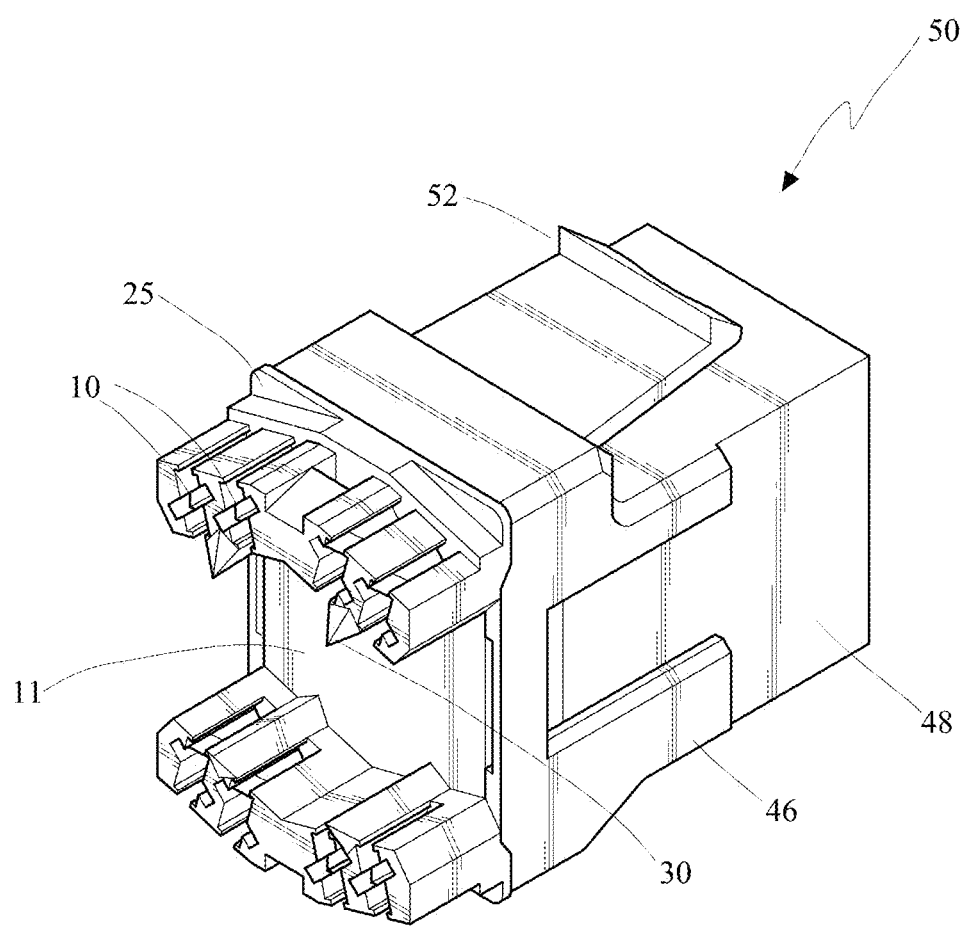
FIG. 4 is a perspective view of the RJ45 jack assembly of the second aspect of the disclosure showing the IDC terminal block configuration.

FIG. 4 shows a perspective view of an RJ45 jack 50 according to a second aspect of the disclosure which includes IDC terminal block 25 attached to the first jack housing 46 and second jack housing 48 of an RJ45 jack. The first jack housing 46 houses the IDC terminal block 25 and provides a means to connect the second jack housing 48.

Figure 5:
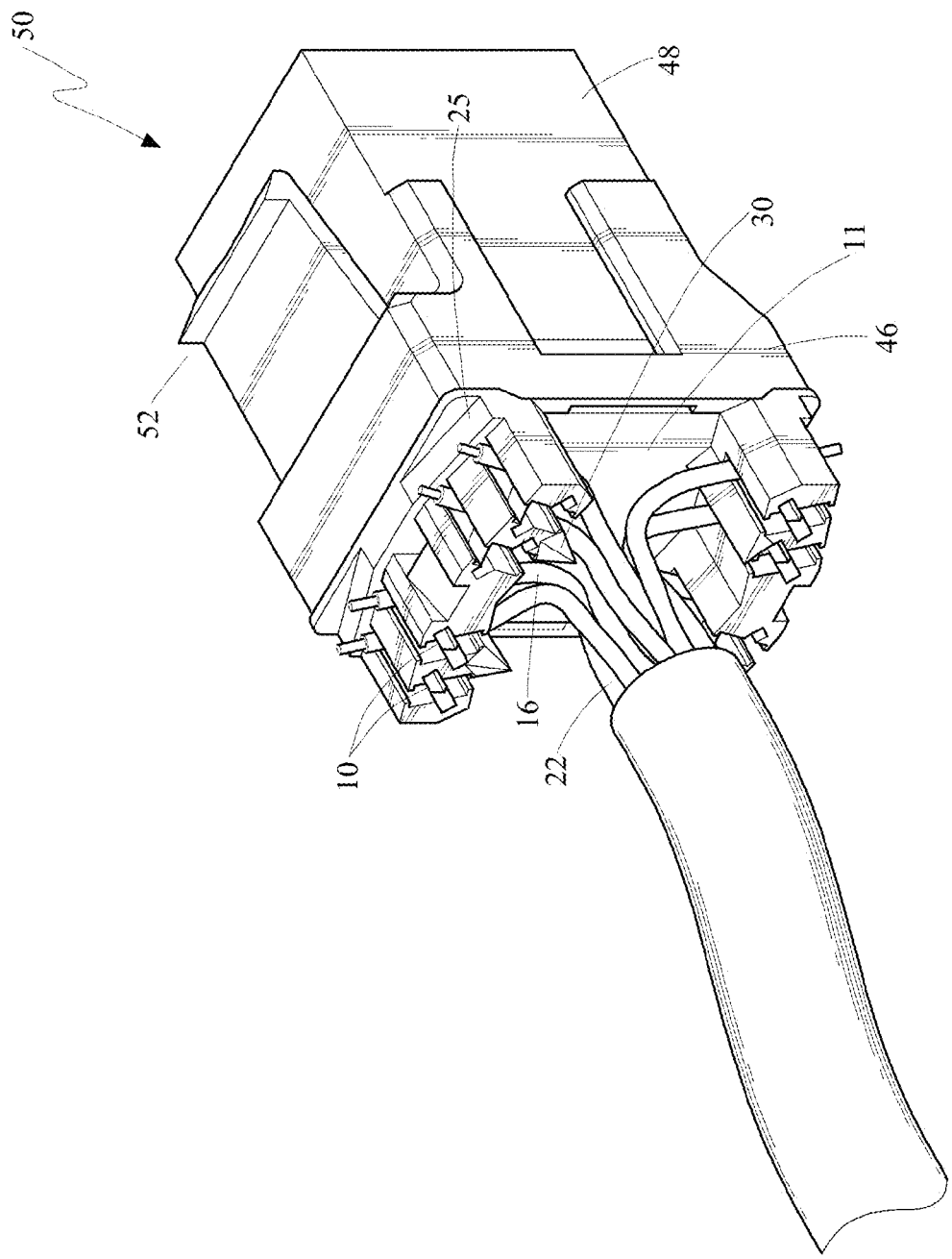
FIG. 5 is a perspective view of the RJ45 jack assembly of the second aspect of the invention showing the IDC terminal block configuration and includes the wire connections.
Figure 6:
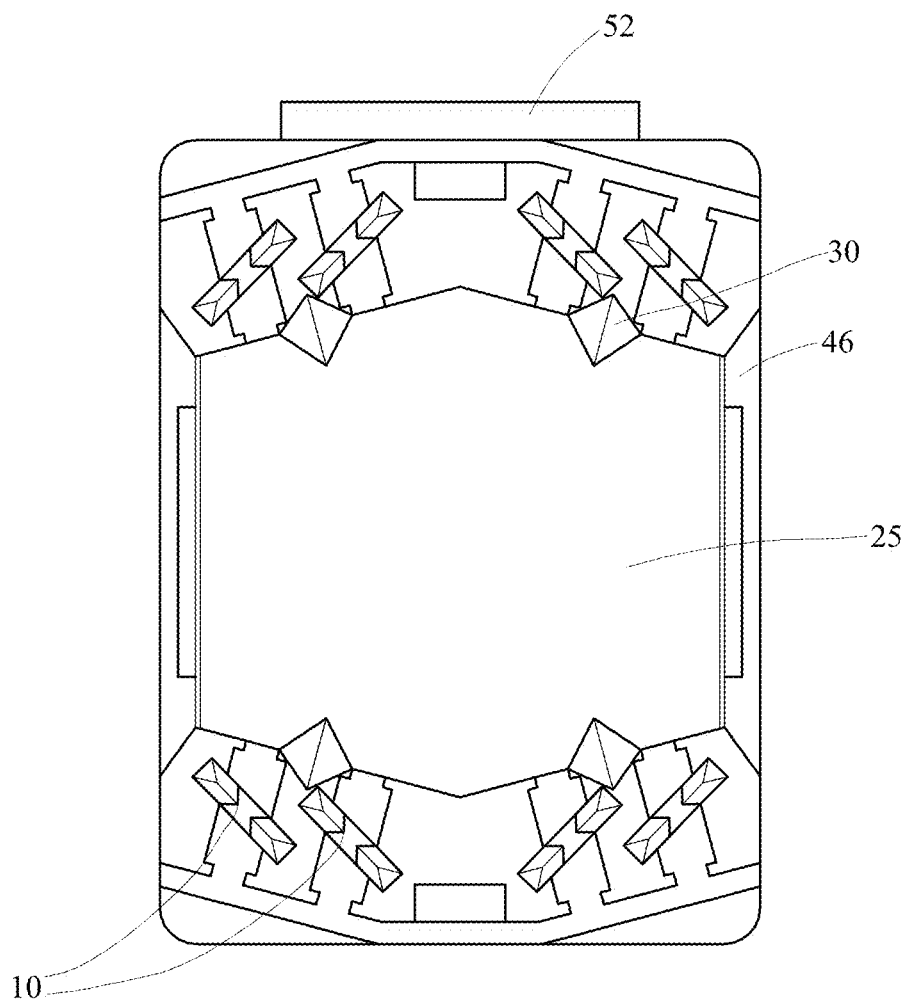
FIG. 6 is a rear view of the RJ45 jack assembly of the second aspect of the disclosure in which four wire pairs have been removed.

FIG. 5 shows a perspective view of an RJ45 jack with wires 16 inserted into the IDCs. Each wire is electrically connected to its respective IDC 10. A cable 60 contains a plurality of twisted pair wires 18 which diverge from a divergence point 22. The geometry of the IDC terminal block 25, as explained above in reference to FIG. 3, allows for minimal untwisting of the wire pairs and also minimises the length of wire pair to wire pair divergence.

Figure 7:
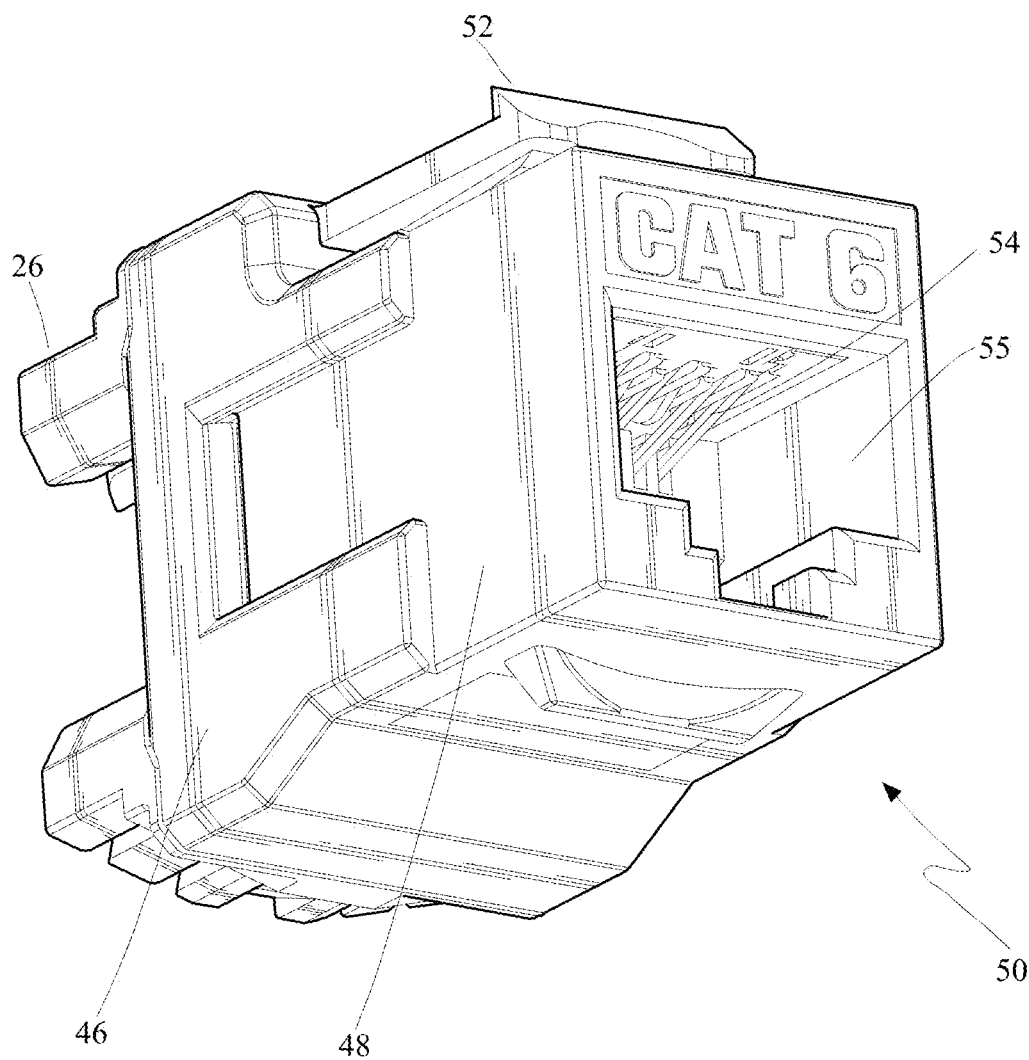
FIG. 7 is a perspective view the RJ45 jack assembly of the second aspect of the disclosure showing the front view of the RJ45 jack housing and the receiving portion of the jack. The view also shows some of the conductive fingers which make electrical contact with an RJ45 plug electrical contacts.
Figure 8:
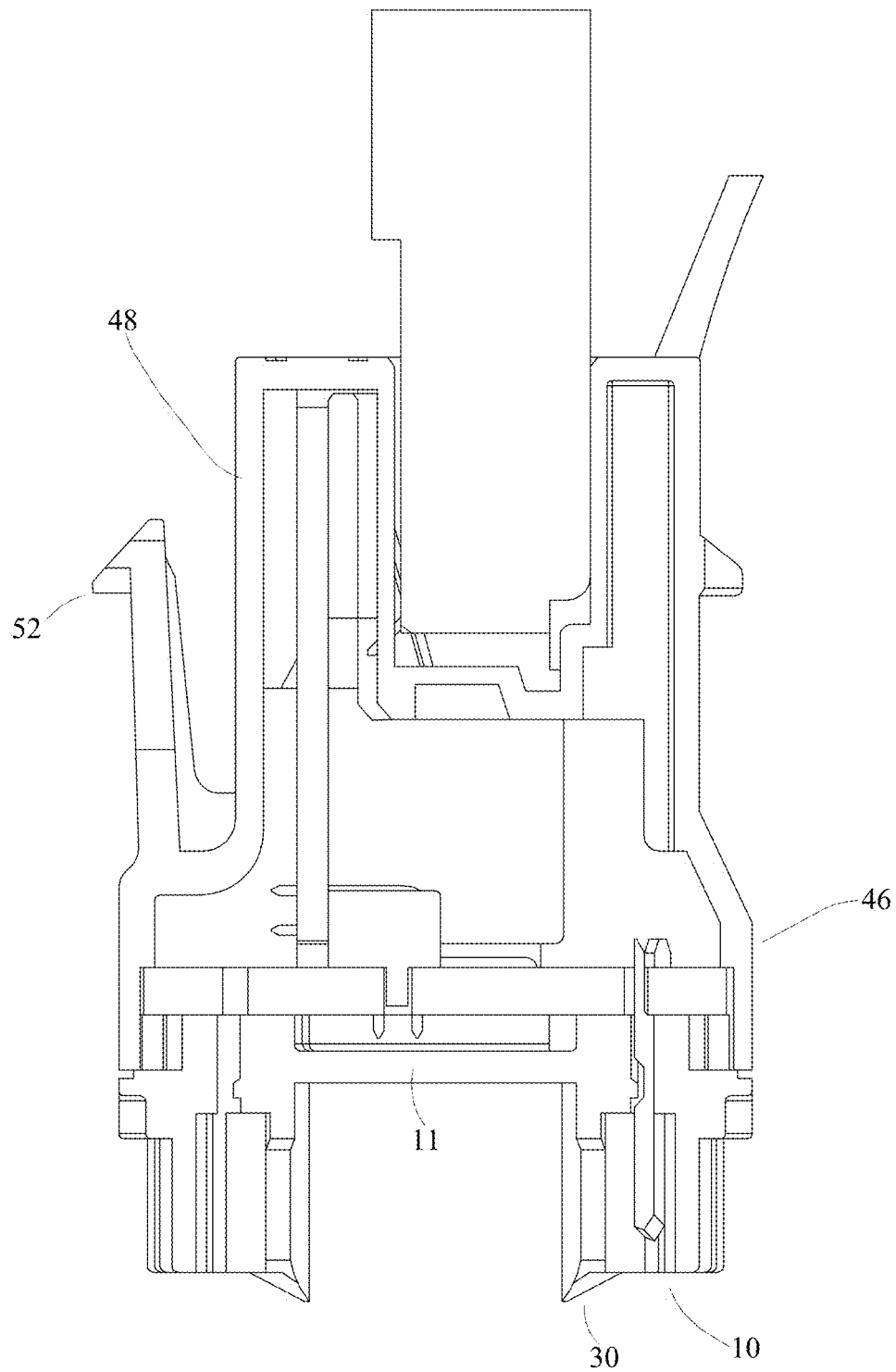
FIG. 8 is a cutaway side view of an RJ45 plug mated with the RJ45 jack assembly of the second aspect of the disclosure in which the internal structure of the jack assembly is shown.
Figure 13:
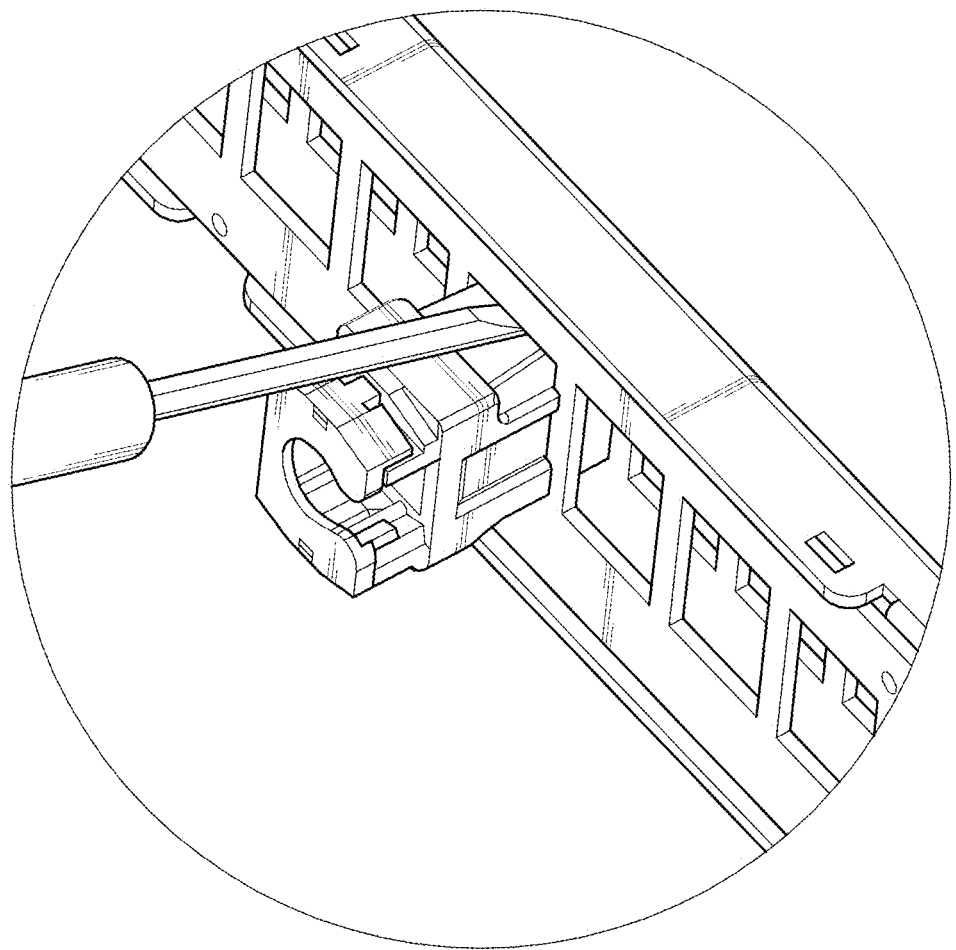
FIG. 13 is a perspective rear view of a patch panel according to the fourth aspect of the disclosure.

FIG. 7 shows a front perspective view of an RJ45 jack 50 electrical connector which consists of first and second jack housings 46 and 48 which define a socket 55 that accepts an RJ45 plug 56. The first and second housing can be integrally formed into one housing (not shown) in an alternative embodiment. The top of the RJ45 jack 50 is fitted with a clip 52, the purpose of which is to facilitate fixing the RJ45 jack 50 into a patch panel chassis (not shown) or wall plate (not shown) wherein the clip 52 is specially shaped to facilitate easy insertion and removal from a wall plate or patch panel chassis by inserting and applying pressure with a flat blade screwdriver as depicted in FIG. 13.

Figure 9:
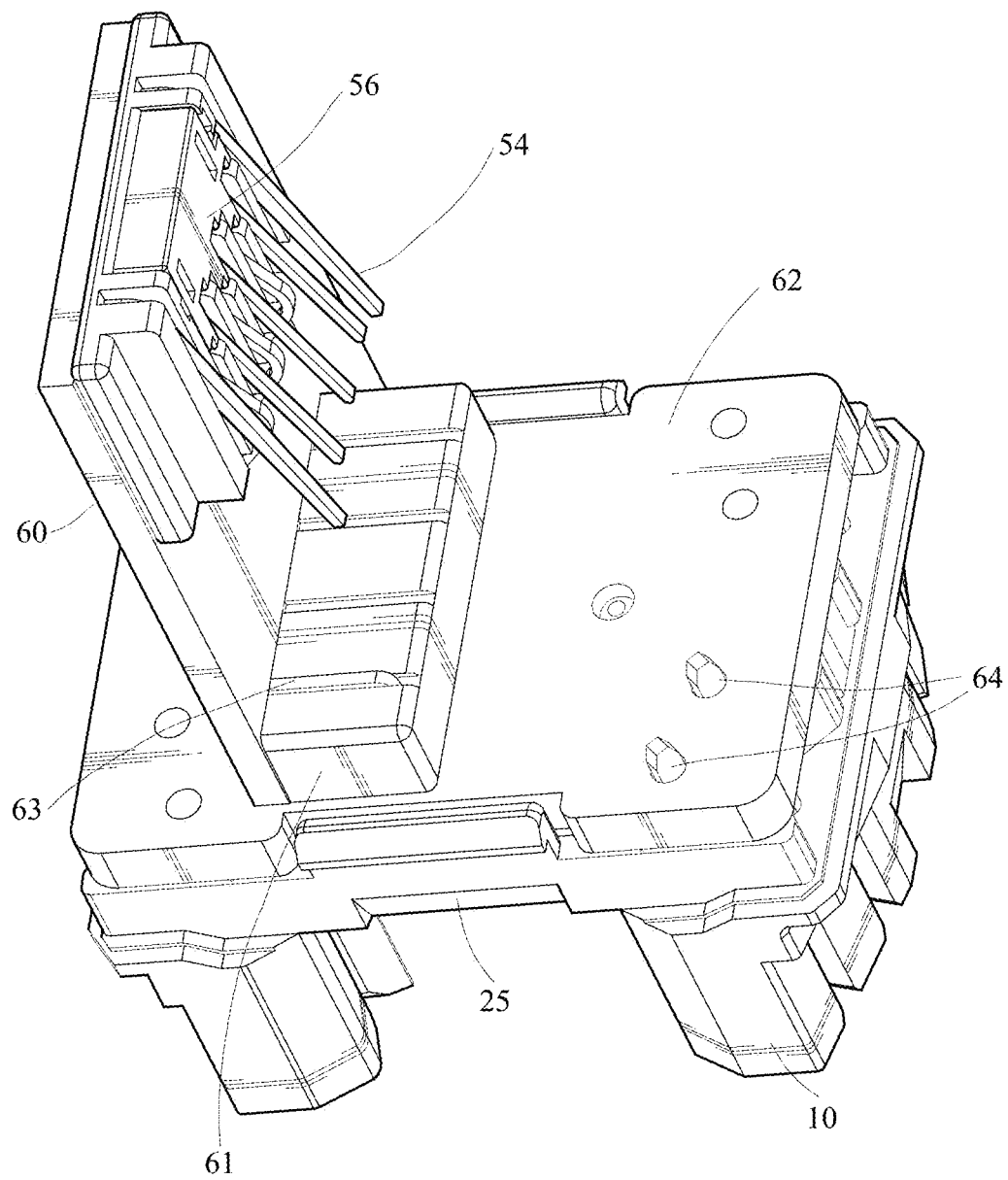
FIG. 9 is a perspective view of the RJ45 jack assembly of the second aspect of the disclosure shown in FIG. 7 in which the front housing of the jack assembly has been removed.

FIG. 9 shows the RJ45 jack 50 without the housings, exposing the crosstalk compensation PCBs 60 and 62. The function of the PCBs is to effect interconnection of the input terminal pairs (not shown) to the respective output terminal pairs (not shown). The first PCB 60 is interconnected to a second PCB 62 orthogonally via PCB interconnection means 61, to conserve space within the RJ45 jack's 50 second housing 48. PCBs 60 and 62 contain a plurality of pairs of signal conductors (not shown) including interdigital capacitors, which are routed appropriately to compensate for and counteract crosstalk. The interdigital capacitors are comprised of suitably dimensioned and shaped PCB track conductors (not shown) connected to the circuit (not shown) on PCB 60 at locations on the PCB 60 which are in close proximity to spring contacts 54 mounted in dielectric block 56. Spring contacts 54 are shaped and positioned to make contact with an RJ45 plug (not shown) and shaped and positioned to minimise crosstalk Further a plurality of output terminal pairs (not shown) are connected to second PCB 62. PCB interconnection means 61 connect the conductive path pairs on the first PCB 60 to the respective conductive path pairs on the second PCB 62, effected by means of interconnection conductors 63, formed so as to hold the two PCB assemblies 60 and 62 in place at right angles with the interconnection conductors 63 spaced far apart so as to minimise crosstalk. The second PCB 62 is connected electrically to IDC's 10 which are mounted at the rear of the RJ45 Jack 50 and which are terminated on the PCB 62 at a set of respective IDC termination locations 64, as well as PCB interconnection means 61 for connection to first PCB 60. Second PCB 62 also comprise a first set of return loss compensation arrays (not shown) effected by means of suitably placed interdigital capacitors, comprised of suitably dimensioned and shaped PCB track conductors (not shown) connected to the pairs of signal conductors at a location on the PCB which is in close proximity to the IDC termination locations 64.

Figure 10:
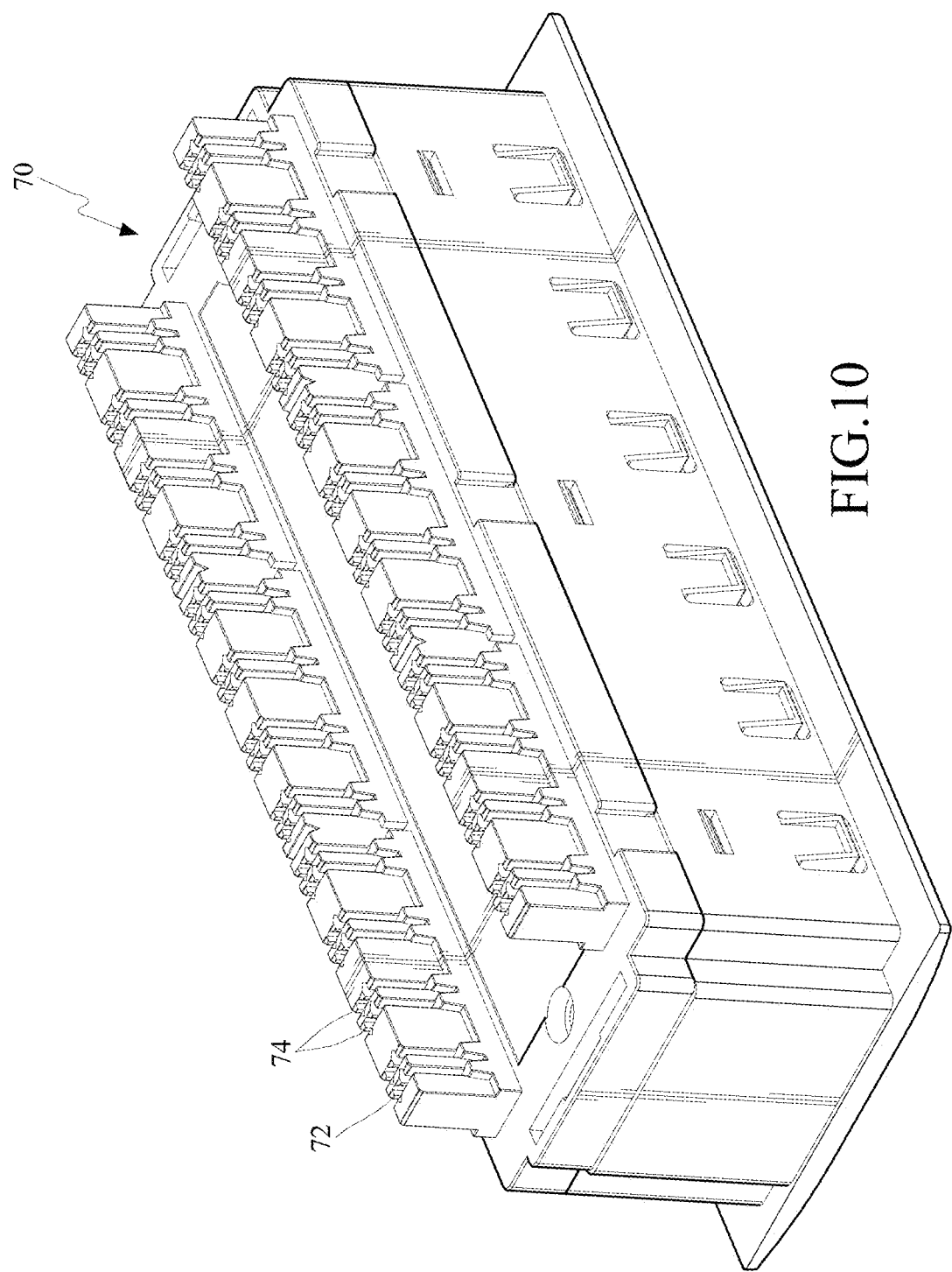
FIG. 10 is a perspective view of a prior art modular patch panel assembly.

FIG. 10 shows a prior art patch panel module 70 which includes prior art DC terminal blocks 72. The prior art IDC terminal blocks 72 include IDCs grouped in pairs 74 The lines joining the centres of each IDC lie on a straight line compared to the conformation of the IDC terminal block 25 in which said lines form a V shape. This prior art patch panel 70 comprises a single module which contains six RJ45 sockets 55 (not shown).

Figure 11:
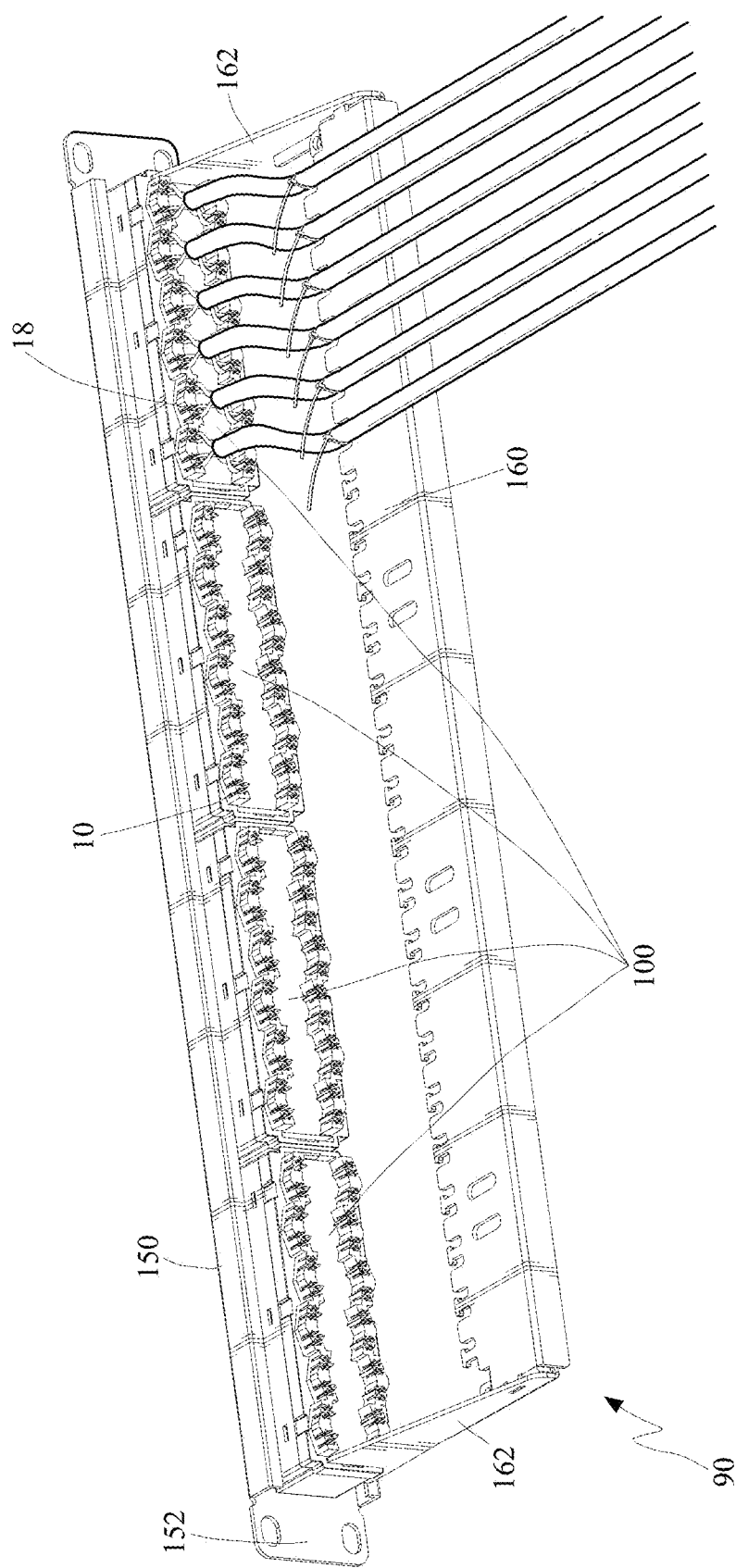
FIG. 11 is a perspective view of a modular patch panel assembly according to a fourth aspect of the disclosure, which comprises 4 IDC terminal block modules according to a third aspect of the disclosure, where each IDC terminal block module contains six RJ54 jacks according to the second aspect of the disclosure which in turn are comprised of a plurality of the IDC terminal blocks according to the first aspect of the disclosure.
Figure 12:
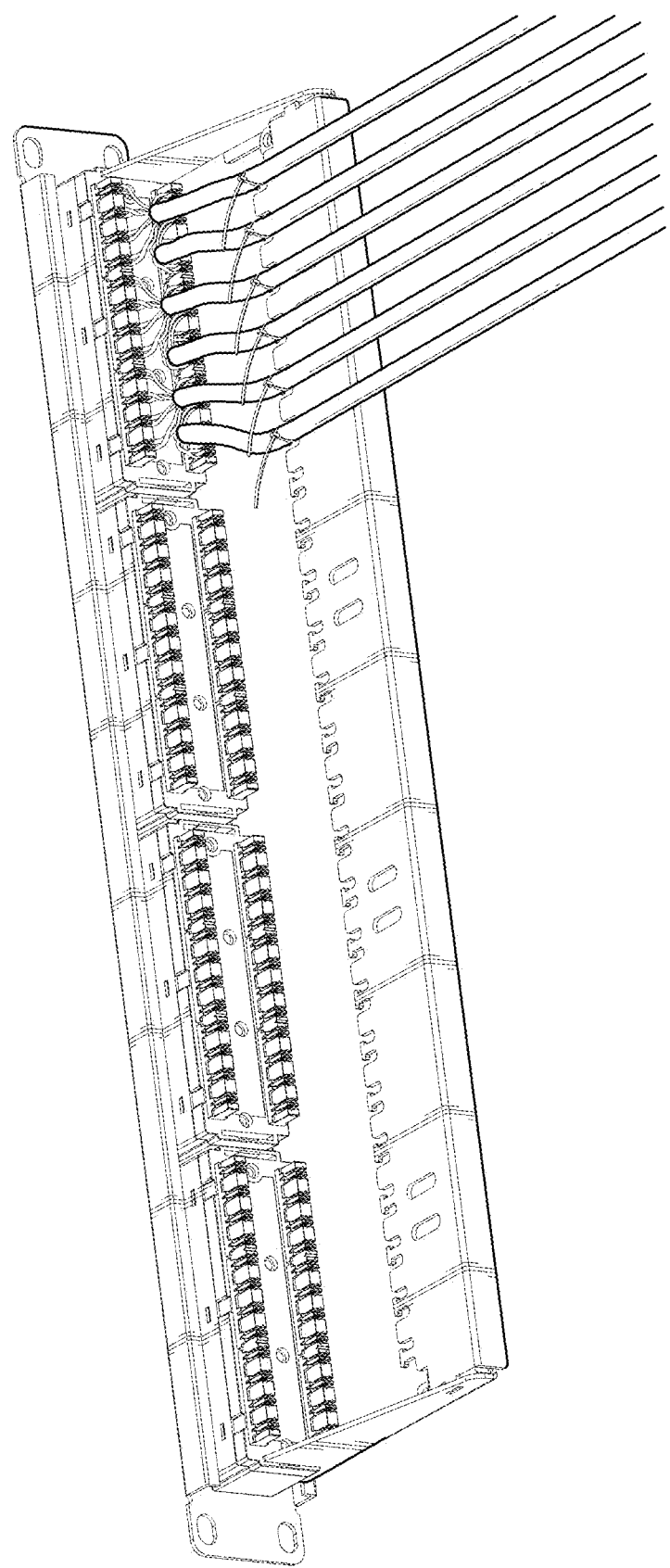
FIG. 12 is a perspective view of a prior art modular patch panel assembly depicting 4 prior art IDC terminal block modules each containing six prior art IDC terminal block jacks integrally formed to make up the module. One module is shown with wires connected.

FIG. 11 shows the rear perspective view of an embodiment of a patch panel 90 according to a third and fourth aspect of the disclosure. Patch panel 90 is a modular patch panel assembly according a fourth aspect of the disclosure which comprises four patch panel modules 100 which are themselves according to a third aspect of the disclosure. The patch panel arrangement comprises a steel patch panel frame 150 a plurality of modular connector inserts (not shown), a steel cable manager frame 160, wherein the steel patch panel frame 150 is designed to removably accommodate the plurality of patch panel module 100. Patch panel 90 is fitted with flanges 152 to permit mounting on a 19" rack (not shown). The steel cable manager frame 160 is mounted by way of cable manager supports 162 and 164. The steel cable manager frame 160 is designed to occupy minimum volume when packed, for easy screwless assembly in the field, and to snap and lock into place on the back of the patch panel 150 once assembled. The V shaped arrangement of IDCs on the rear of each patch panel module 100 can be contrasted with those on the rear of prior art patch panel 70 of FIG. 12. The steel patch panel frame 150 may accommodate up to twenty-four RJ style connector ports 50, horizontally disposed. It may be fitted with an optional facia attachment (not shown) which may be used for port designation purposes and is designed to improve cosmetic appearance.

It will be apparent to persons skilled in the art that various modifications may be made in details of design and construction of the disclosure, without departing from the scope or ambit of the present disclosure. In particular whilst the disclosure has been described by reference to a RJ45 electrical connector it is not limited to such an application.

What is claimed is:

1. An insulation displacement contact terminal block for providing electrical contact with a bundle of twisted pair wires having at least two differentially driven wire-pairs, a first wire-pair of the at least two wire-pairs diverging form a second wire-pair of the at least two wire-pairs at a diverging point of the bundle of the twisted pair wires, and a first wire of the first wire-pair untwisting from a second wire of the first wire-pair at an untwisting point, a first wire of the second wire-pair untwisting from a second wire of the second wire-pair at an untwisting point, the insulation displacement contact terminal block comprising:

- a first contact-pair comprising a first insulation displacement contact and a second insulation displacement contact for electrical connection with respective the first and second wires of the first wire-pair;
- a second contact-pair comprising a first insulation displacement contact and a second insulation displacement contact for electrical connection with respective the first and second wires of the second wire-pair and
- at least two protruding portions located centrally between the first insulation displacement contact and the second insulation displacement contact of the first contact-pair and second contact-pair, respectively, the at least two protruding portions being shaped so as to facilitate splitting apart the twisted wire pair as the wire pair is inserted into IDC terminal block;

wherein the first and second insulation displacement contacts of each of the first and second contact pairs are substantially equidistant from the untwisting point and are proximate to the untwisting point for minimizing crosstalk between the first wire-pair and the second wire-pair, wherein the first and second insulation displacement contacts of each of the first and the second contact pairs are substantially adjacent to each other and the first and second contact-pairs are sufficiently remote from each other for minimizing cross-talk between the first and second wire-pairs and provide minimum degradation of return loss of the circuit defined by each of the first and second wire-pairs.

2. The insulation displacement contact terminal block according to claim 1, wherein the first and second contact-pairs are arranged in a mirror image for forming a V shape.

3. An electrical jack comprising the insulation displacement contact terminal block according to claim 1, wherein the insulation displacement contact terminal block is electrically connected to a jack housing of the electrical jack.

4. A jack module comprising at least two electrical jacks according to claim 3.

5. A modular patch panel assembly comprising at least one jack module according to claim 4, wherein the at least one jack module is configured to be received and retained within a jack module housing configured to be rack mounted.

* * * * *